United States Patent
Good et al.

(10) Patent No.: US 10,481,592 B2
(45) Date of Patent: Nov. 19, 2019

(54) SELECTING MANUFACTURING SETTINGS BASED ON HISTORICAL DATA FROM MANUFACTURING TOOLS

(71) Applicant: GLOBALFOUNDRIES Inc., Grand Cayman (KY)

(72) Inventors: Richard P. Good, Saratoga Springs, NY (US); Dirk Gleitsmann, Senftenberg (DE); Daniel Zschaebitz, Dresden (DE)

(73) Assignee: GLOBALFOUNDRIES INC., Grand Cayman (KY)

( * ) Notice: Subject to any disclaimer, the term of this patent is extended or adjusted under 35 U.S.C. 154(b) by 24 days.

(21) Appl. No.: 15/795,431

(22) Filed: Oct. 27, 2017

(65) Prior Publication Data
US 2019/0129390 A1 May 2, 2019

(51) Int. Cl.
*G05B 19/418* (2006.01)
(52) U.S. Cl.
CPC .......... *G05B 19/4188* (2013.01); *G05B 2219/32074* (2013.01); *G05B 2219/45031* (2013.01)

(58) Field of Classification Search
None
See application file for complete search history.

(56) References Cited

U.S. PATENT DOCUMENTS

| | | | |
|---|---|---|---|
| 6,584,369 B2 | 6/2003 | Patel et al. | |
| 6,790,686 B1 | 9/2004 | Purdy et al. | |
| 7,502,715 B1 * | 3/2009 | Middlebrooks | G05B 13/048 700/31 |
| 8,295,965 B2 | 10/2012 | Wu et al. | |
| 2005/0047645 A1 * | 3/2005 | Funk | G05B 19/41865 382/145 |
| 2008/0076046 A1 * | 3/2008 | Willis | G01N 21/4788 430/30 |
| 2010/0191363 A1 * | 7/2010 | Zou | G05B 19/41835 700/121 |
| 2010/0249967 A1 * | 9/2010 | Barlovic | G05B 19/41865 700/99 |
| 2013/0204418 A1 * | 8/2013 | Chang | G05B 19/41875 700/97 |

* cited by examiner

*Primary Examiner* — Ziaul Karim
(74) *Attorney, Agent, or Firm* — David Cain; Hoffman Warnick LLC

(57) ABSTRACT

Methods according to the disclosure include: identifying at least one non-candidate tool which previously processed at least one prior semiconductor wafer, and represented in a set of historical data, the set of historical data including manufacturing settings for performing an operation on the at least one prior semiconductor wafer, and a candidate tool which has not previously performed the operation on at least one prior semiconductor wafer, the candidate tool not being represented in the set of historical data; determining whether the set of historical data predicts the performing of the operation with the candidate tool based on the manufacturing settings for performing the operation on the at least one prior semiconductor wafer; and in response to the set of historical data predicting the performing of the operation with the candidate tool, selecting a manufacturing setting for the candidate tool based on the set of historical data.

14 Claims, 8 Drawing Sheets

| Tool/Chamber | Status |
| --- | --- |
| TOOL1 | Busy |
| TOOL2 | Busy |
| TOOL3 | Busy |
| TOOL4 | Busy |
| TOOL5 | Busy |
| TOOL6 | Busy |
| TOOL7 | Busy |
| TOOL8 | Busy |
| TOOL9 | Available |
| TOOL10 | Available |
| TOOL11 | Available |
| TOOL12 | Available |
| TOOL13 | Busy |
| TOOL14 | Busy |
| TOOL15 | Busy |
| TOOL16 | Busy |

FIG. 3

| Tool/Chamber | Status |
|---|---|
| TOOL1 | Busy |
| TOOL2 | Busy |
| TOOL3 | Busy |
| TOOL4 | Busy |
| TOOL5 | Busy |
| TOOL6 | Busy |
| TOOL7 | Busy |
| TOOL8 | Busy |
| TOOL9 | Available |
| TOOL10 | Available |
| TOOL11 | Available |
| TOOL12 | Available |
| TOOL13 | Busy |
| TOOL14 | Busy |
| TOOL15 | Busy |
| TOOL16 | Busy |

FIG. 4

SELECTING MANUFACTURING SETTINGS BASED ON HISTORICAL DATA FROM MANUFACTURING TOOLS

BACKGROUND

Technical Field

The present disclosure relates to the manufacture of integrated circuits (ICs) from semiconductor wafers. More specifically, the present disclosure relates to methodologies for dispatching semiconductor wafers to various tools for manufacture, while accounting for the absence of historical manufacturing data for some of the available tools.

Related Art

Fabrication foundries ("fabs") may manufacture integrated circuits (ICs) using photolithographic processes. Photolithography is an optical printing and fabrication process by which patterns on a photolithographic mask (i.e., photomask) are imaged and defined onto a photosensitive layer coating of a substrate. To manufacture an IC, photomasks are created using a specification, including an IC layout, as a template. The photomasks contain the various geometries of the IC layout. The various geometries contained on the photomasks correspond to the various base physical IC elements that make up functional circuit components such as transistors, interconnect wiring, via pads, as well as other elements that are not functional circuit elements but are used to facilitate, enhance, or track various manufacturing processes. Through sequential use of the various photomasks corresponding to a given IC in an IC fabrication process, a large number of material layers of various shapes and thicknesses with different conductive and insulating properties may be built up to form the overall IC and the circuits therein.

The manufacture of an IC may be carried out on a bulk semiconductor wafer, with a group of bulk semiconductor wafers being known as a "lot." A single manufacturing process may employ deposition tools, etching tools, heat-transmitting devices (e.g., flash lamps, lasers, and/or hot plates), and/or other tools, each with a significant number of adjustable settings. Conventional manufacturing processes may rely upon historical data for a product, tool, operation, etc., to improve the tool's reliability and/or manufacturing quality. Such conventional processes may calibrate new tools by manufacturing a "test product," e.g., intentionally sending wafers to a new tools to calibrate and select settings for the future manufacture of a product.

In light of the significant expense of installing new devices and the ever-increasing demand for IC products, the amount of time and resources needed to send ahead a subset of wafers to initialize the process is disadvantageous to a manufacturer. Some manufacturing lines may include "non-threaded controllers" configured to import historical data associated with other similar tools to reduce the need to use send-ahead wafers. However, a device for dispatching wafers to a tool in the manufacturing line may be unable to determine whether a sufficient amount of data is available to perform an operation on a wafer with a new tool. This technical obstacle has been shown to reduce the usefulness of non-threaded controllers.

SUMMARY

A first aspect of the disclosure provides a method including: identifying, from a plurality of tools for performing an operation on a semiconductor wafer: at least one non-candidate tool which previously performed the operation on at least one prior semiconductor wafer, wherein the at least one non-candidate tool is represented in a set of historical data, and wherein the set of historical data includes manufacturing settings for performing the operation on the at least one prior semiconductor wafer, and a candidate tool which has not previously performed the operation on at least one prior semiconductor wafer, wherein the candidate tool is not represented in the set of historical data; determining whether the set of historical data predicts the performing of the operation with the candidate tool based on the manufacturing settings for performing the operation on the at least one prior semiconductor wafer; and in response to the set of historical data predicting the performing of the operation with the candidate tool, selecting a manufacturing setting for the candidate tool based on the set of historical data.

A second aspect of the disclosure provides a computer program product stored on a computer readable storage medium, the computer program product including program code, which, when being executed by at least one computing device, causes the at least one computing device to: identify, from a plurality of tools for performing an operation on a semiconductor wafer: at least one non-candidate tool which previously performed the operation on at least one prior semiconductor wafer, wherein the at least one non-candidate tool is represented in a set of historical data, and wherein the set of historical data includes manufacturing settings for performing the operation on the at least one prior semiconductor wafer, and a candidate tool which has not previously performed the operation on at least one prior semiconductor wafer, wherein the candidate tool is not represented in the set of historical data; determine whether the set of historical data predicts the performing of the operation with the candidate tool based on the manufacturing settings for performing the operation on the at least one prior semiconductor wafer; and in response to the set of historical data predicting the performing of the operation with the candidate tool, select a manufacturing setting for the candidate tool based on the set of historical data.

A third aspect of the present disclosure provides a system having at least one computing device configured to perform a method by performing actions including: identify, from a plurality of tools for performing an operation on a semiconductor wafer: at least one non-candidate tool which previously performed the operation on at least one prior semiconductor wafer, wherein the at least one non-candidate tool is represented in a set of historical data, and wherein the set of historical data includes manufacturing settings for performing the operation on the at least one prior semiconductor wafer, and a candidate tool which has not previously performed the operation on at least one prior semiconductor wafer, wherein the candidate tool is not represented in the set of historical data; determine whether the set of historical data predicts the performing of the operation with the candidate tool based on the manufacturing settings for performing the operation on the at least one prior semiconductor wafer; and in response to the set of historical data predicting the performing of the operation with the candidate tool, select a manufacturing setting for the candidate tool based on the set of historical data.

BRIEF DESCRIPTION OF THE DRAWINGS

FIG. 3 depicts an example listing of possible tools for dispatch before implementing methods according to the disclosure.

FIG. 4 depicts an example listing of possible tools for dispatch after implementing methods according to the disclosure.

Figure 1:
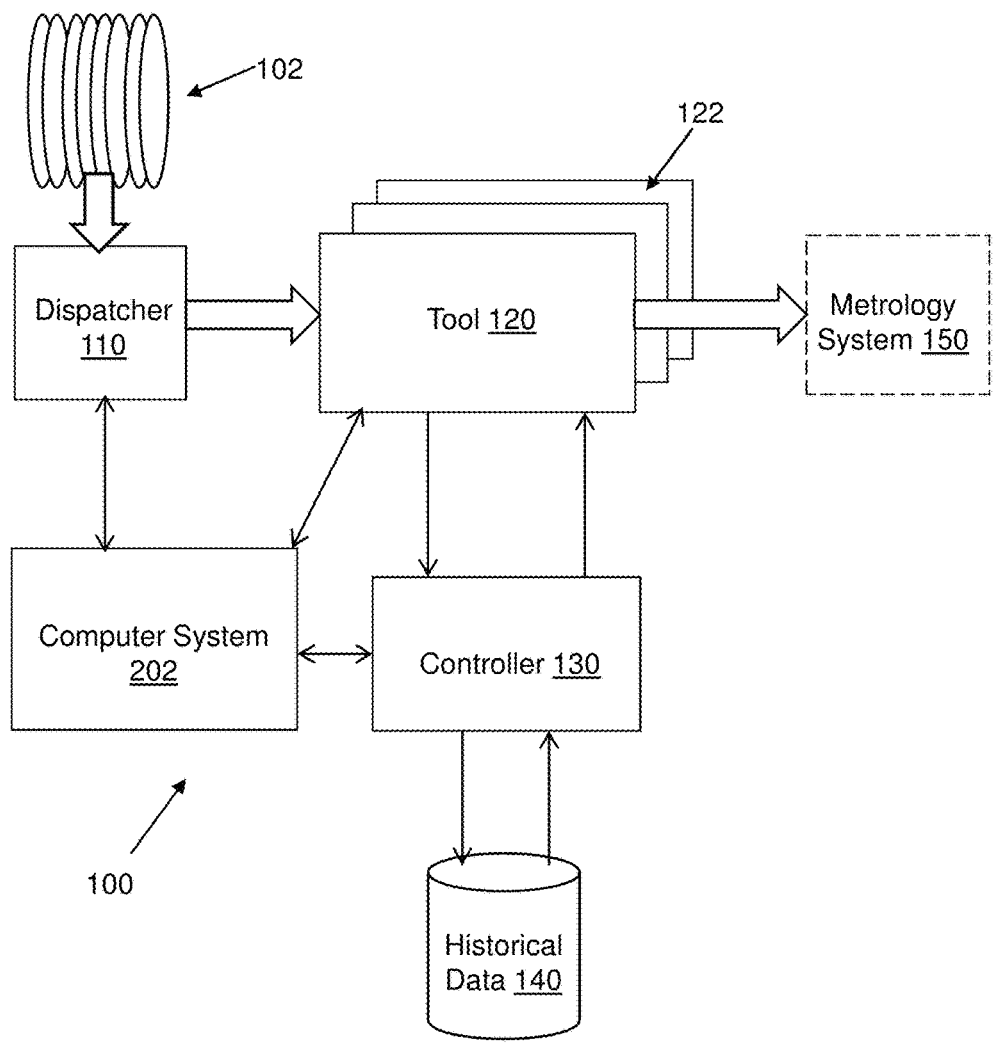
FIG. 1 provides a schematic diagram of a pre-metrology integrated circuit (IC) manufacturing system according to embodiments of the disclosure.

It is noted that the drawings of the disclosure are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Introduction and General Definitions

Embodiments of the disclosure rely upon image processing techniques to automate various aspects of integrated circuit (IC) (alternatively, "circuit") manufacture. More specifically, embodiments of the disclosure automatically select manufacturing settings for tools without associated sets of historical data for a particular process, and additionally may assess whether historical data available for other tools and processes is sufficient for selecting the settings of the tools under analysis. The method further includes various operational methodologies for determining the sufficiency of available historical data for a tool under analysis.

To better illustrate the various embodiments of the present disclosure, particular terminology which may be known or unknown to those of ordinary skill in the art is defined to further clarify the embodiments set forth herein. The term "system" may refer to a computer system, server, etc., composed of hardware and/or software components. A "tool," sometimes known or referred to as a "manufacturing tool," refers to any device capable of modifying, adding, or removing material to/from a semiconductor wafer during the manufacture of an integrated circuit (IC). Thus, a tool may include one or more of a deposition tool, etching tool, heat-transmitting device (e.g., flash lamps, lasers, and/or hot plates), and/or other device with adjustable settings and configured for modifying the physical properties of a semiconductor wafer. An "operation" refers to any manufacturing procedure implemented by a tool. In some cases, an operation may be defined as a combination of instructions for manufacturing one unit, e.g., the identity of a product being manufactured, and a layer of the product to be manufactured. The term "historical data" refers to the various manufacturing settings, operational characteristics, wafer properties, product identifications, layer identifications, and/or tool identifications for past operations performed on a semiconductor wafer. The terms "represent," "represented," "representation," and variants thereof, in the context of historical data, refer to the presence of information for at least one prior operation for a specific tool in a set of historical data. In the case where an operation includes both a product to be manufactured and a layer of implementation, one tool being represented in the set of historical data may indicate, e.g., a past instance of manufacturing the same layer of the same product with the same tool. A "non-candidate tool" refers to any tool represented in the historical data, and thus associated with at least one set of prior manufacturing settings for an operation. A "candidate tool" refers to any tool not represented in the historical data, and therefore not associated with a prior manufacturing setting for at least one operation. It is emphasized that in embodiments of the disclosure, a tool being identified as a "non-candidate tool" denotes that historical data from a past operation is available for the tool, and that either a "candidate tool" or "non-candidate tool" may eventually be selected to perform a given operation. The concept of candidacy in this situation merely refers to the possibility of using historical data for some tools, for a particular operation, to predict the performance of a tool without historical data for the particular operation.

In addition to the above-noted terms relating to tools and operations, further terminology may relate to instruments and/or procedures provided in combination with various tools in a manufacturing line. A "controller" may refer to a system, module, device, and/or other component communicatively connected to at least one tool and configured to adjust the settings of the tool before an operation begins. A "dispatcher" generally refers to any system, module, device, and/or other component configured to select one or more tools where a particular semiconductor wafer will undergo an operation. "Metrology" refers to post-fabrication analysis of a product or group of products, and generally includes analytical techniques implemented on an at least-partially fabricated device, e.g., optical proximity correction (OPC), optical rule checking (ORC), etc.

Pre-Metrology Circuit Manufacture with Dispatcher and Controller

FIG. 1 provides a schematic diagram of a system and associated components for IC manufacture according to embodiments of the disclosure. A manufacturing system 100 may include, e.g., a plurality of semiconductor wafers 102 (sometimes known in the art as a "lot" or "wafer lot") to be fabricated into various IC product units. The rectangular arrows depict movement of wafer(s) 102 to a dispatcher 110, tool(s) 120, and then to subsequent components during manufacture. The line-shaped arrows of system 100 in FIG. 1 indicate communicative connections between various components. System 100 may include one or more dispatchers 110 configured to select one of a plurality of tools 120 where each wafer 102 will be sent to undergo a particular manufacturing process (e.g., deposition, etching, heating, and/or combinations of processes). Tools 120 may be included in a plurality of tools 122, with each tool 120 in plurality 122 being provided to distribute the manufacturing load on system 100 during periods of high demand. That is, each tool 120 may be configured to process at least one wafer 102 in parallel with other tools 120. A tool 120 currently not performing an operation on wafer(s) 102 may be identified as "available," i.e., ready to accept a new wafer 102 and perform an operation. Tools 120 currently performing an operation on wafer(s) 102 or otherwise not ready to begin performing an operation may be identified as "busy." When multiple tools have been installed, and manufacturing demand is high, objectives of administering system 100 may include minimizing the number of idling tools, dispatching wafers 102 to the correct tools 120, and more generally increasing the efficient use of capital resources.

To further improve the versatility and customization of products and/or product units, each tool 120 may be configured to perform a plurality of distinct processes under corresponding sets of conditions. For example, an etching tool may apply a predetermined etch rate in one operation, or alternatively apply a faster or slower etch rate in another operation. Similarly, the rates and/or types of etching, depositing, heating, etc., may vary for each tool 120 and/or operation. Thus, references to a "manufacturing setting" may cumulatively or individually refer to example settings such as an etch time, an etch rate, a deposition time, deposition rate, heating temperature, heating time, etc., for a particular operation. To account for tools 120 with limited amounts of computer architecture included therein, system 100 one or more controllers 130 may be communicatively connected (e.g., by wired and/or wireless networking) to one or more tools 120 in plurality of tools 122 to adjust and/or provide manufacturing settings for each operation. Controller 130, in turn, may include or otherwise be in communication with a repository of historical data 140 representative of manufacturing settings for some tools 120 performing past instances of the same operation or other operations. After each wafer 102 is processed by one or more tools 120, the modified wafers 102 may be provided to a metrology system 150 for measuring the size and shape of fabricated ICs. As discussed in further detail elsewhere herein, system 100 may include one or more computer systems 202 which may subsume and/or otherwise be in communication with dispatcher 110, plurality of tools 122, and/or controller 130. Computer system 202 may be configured to allow one or more tools 120 to perform operations on semiconductor wafers 102 regardless of whether a particular tool 120 and/or corresponding operation is represented in historical data 140.

Figure 2:
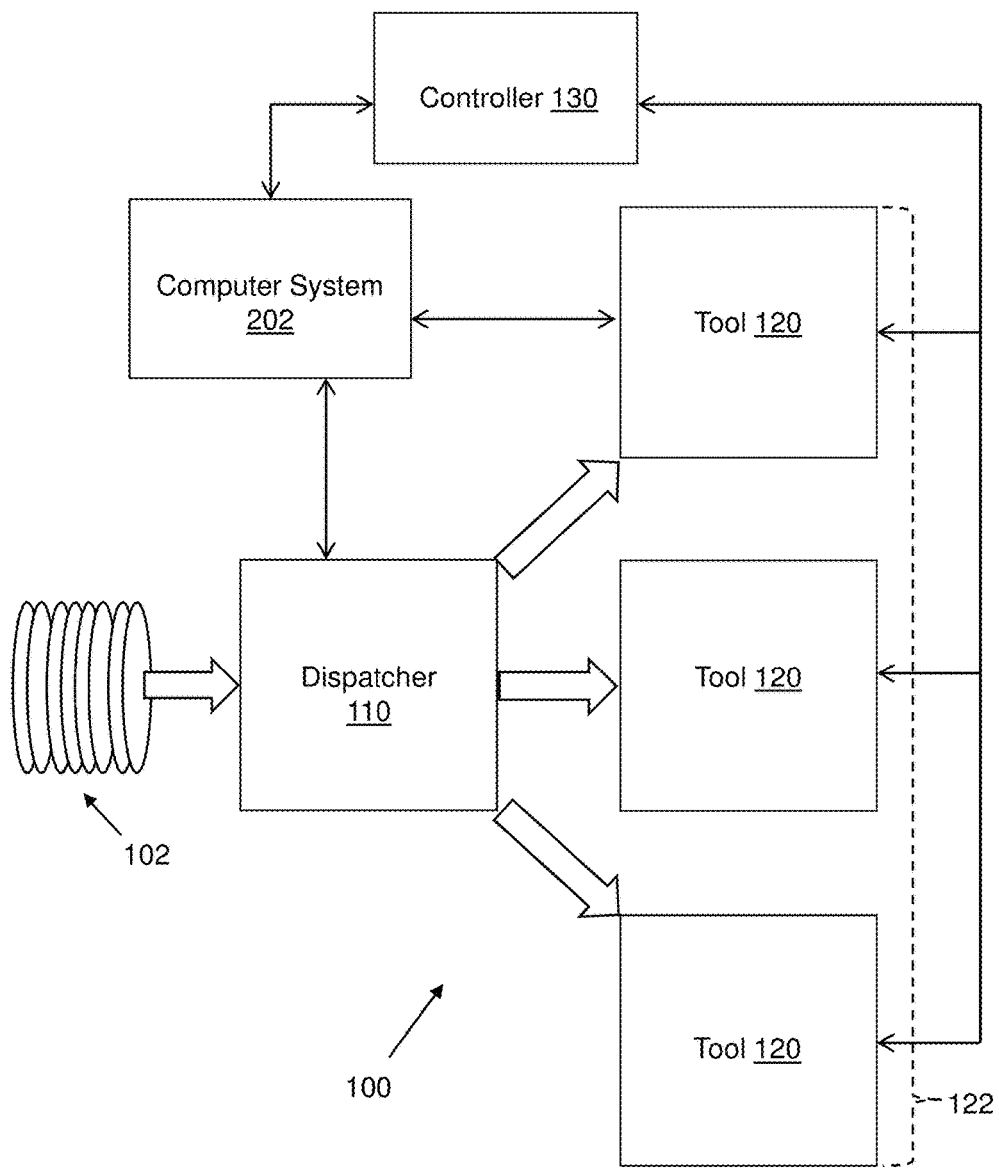
FIG. 2 provides an expanded schematic diagram of the dispatcher component in the pre-metrology IC manufacturing system according to embodiments of the disclosure.

Referring to FIG. 2, the role of dispatcher 110 and computer system 202 in methods according to the disclosure is discussed in further detail. According to an example, plurality of tools 122 is shown to include three tools 120, each of which may accept one semiconductor wafer 102 based on the logic, methodology, etc., employed by dispatcher 110 and/or computer system 202. It is understood that fewer than three tools 120 or more than three tools 120 (e.g., hundreds of tools 120) may be included in plurality of tools 122. Embodiments of the present disclosure may be executed with and/or subsequent to conventional techniques for selecting tools 120 where semiconductor wafer(s) 102 will undergo an operation.

Referring to FIGS. 2 and 3 together, FIG. 3 illustrates a listing of "available" and "busy" tools 120 (identified as TOOL1, TOOL2, TOOL3, etc., in FIG. 3) in system 100 at a given point in time. Through the communicative connection between tool(s) 120 and dispatcher 110 and/or computer system 202, each tool 120 in plurality of tools 122 may be denoted as busy or available at a given point in time. Simultaneously with identifying busy and available tools 120, computer system 202 and dispatcher 110 may examine and/or process information in historical data 140 to evaluate whether any tools 120 have previously implemented an operation to be performed on semiconductor wafer(s) 102. In the example of FIG. 3, tools 120 highlighted in grey denote tools 120 known to be capable of performing a given operation with appropriate manufacturing settings, due to being represented in historical data 140. That is, tools 120 highlighted in gray are non-candidate tools 120b (FIG. 5) previously used for performing the same operation on a prior semiconductor wafer 102. Non-highlighted tools 120 are candidate tools 120a (FIG. 5), which may or may not be able to perform the operation, depending on the sufficiency of historical data 140. As further shown in the example of FIG. 3, none of the tools 120 (i.e., non-candidate tools 120b) with past operational data represented in historical data 140 are available at the present time, i.e., all busy. The absence of available tools 120 will cause a bottleneck in the processing of semiconductor wafers 102, thereby causing a reduced output or delay in meeting the demand for one or more products.

Referring now to FIGS. 2 and 4 together, embodiments of the disclosure use information in historical data 140 from other tools 120 and/or operations to determine whether other tools without the same data may perform the same operation. As discussed in further detail elsewhere herein, computer system 202 may examine the types of operations, tools 120, etc., represented in historical data 140 to determine whether historical data 140 is sufficient to predict settings for how other tools may perform a particular operation on semiconductor wafer 102. The various embodiments discussed herein, more specifically, may determine whether candidate tools 120a may perform a particular operation, despite not being represented in historical data 140. FIG. 4 thus illustrates a possible result of methods according to the disclosure, e.g., determining that some available candidate tools 120a (highlighted with grey and boldface) are capable of performing an operation on semiconductor wafer 102, even though they are not directly represented in historical data 140.

Controllers 130 configured to generate manufacturing settings for one tool 120 based on historical data 140 for other tools 120 may be known in the art as "non-threaded controllers." By contrast, a "threaded controller" may only generate manufacturing settings for tools 120 represented in historical data 140. The present disclosure allows dispatcher(s) 110 to submit semiconductor wafers 102 to tools 120 not represented in historical data 140. Embodiments of the disclosure therefore assist non-threaded controllers in fulfilling their role of selecting manufacturing settings for tools 120 not represented in historical data 140.

Computer System and Example Components

Figure 5:
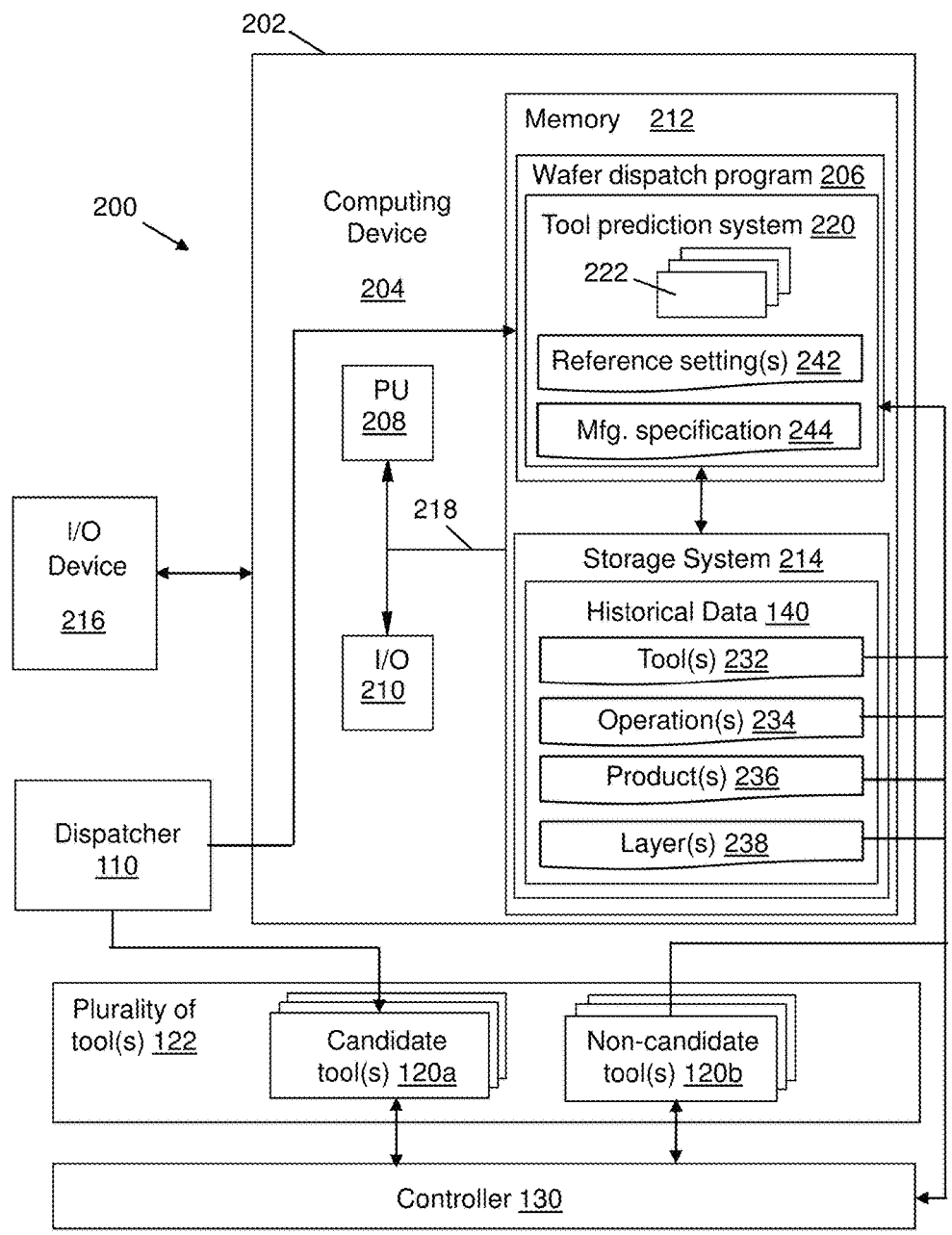
FIG. 5 depicts an illustrative environment, which includes a computer system configured to interact with a dispatcher, plurality of tools, and controller according to embodiments of the disclosure.

Referring to FIG. 5, an illustrative environment 200 for implementing the methods and/or systems described herein is shown. In particular, computer system 202 of environment 200 is shown as including computing device 204. Computing device 204 may include a wafer dispatch program 206 which may include, e.g., one or more sub-systems (including without limitation, tool prediction system 220 discussed elsewhere herein) for performing any/all of the processes described herein and implementing any/all of the embodiments described herein.

Computer system 202 is shown including a processing unit (PU) 208 (e.g., one or more processors), an I/O component 210, a memory 212 (e.g., a storage hierarchy), an external storage system 214, an input/output (I/O) device 216 (e.g., one or more I/O interfaces and/or devices), and a communications pathway 218. In general, processing unit 208 may execute program code, such as wafer dispatch program 206, which is at least partially fixed in memory 212. Although storage system 214 is shown to be a portion of memory 212, it is understood that storage system 214 may be external to computing device 204 in further embodiments. While executing program code, processing unit 208 may process data, which may result in reading and/or writing data from/to memory 212 and/or storage system 214. Pathway 218 provides a communications link between each of the components in environment 200. I/O component 210 may comprise one or more human I/O devices, which enable a human user to interact with computer system 202 and/or one or more communications devices to enable a system user to communicate with the computer system 202 using any type of communications link. To this extent, wafer dispatch program 206 may manage a set of interfaces (e.g., graphical user interface(s), application program interface(s), etc.) that enable system users to interact with wafer dispatch program 206. Further, wafer dispatch program 206 may manage (e.g., store, retrieve, create, manipulate, organize, present, etc.) data, through several modules contained within a tool prediction system 220. Tool prediction system 220 is shown by example as being a sub-systems of wafer dispatch program 206. However, it is understood that tool prediction system 220 may alternatively be embodied as a wholly or partially independent system.

As noted herein, wafer dispatch program 206 may include tool prediction system 220. A set of modules 222 of tool prediction system 220 may enable computer system 202 to perform a set of tasks used by wafer dispatch program 206, and may be separately developed and/or implemented apart from other portions of wafer dispatch program 206. Modules 222 may include one or more of, e.g., a calculator for implementing various mathematical computations in processes discussed herein, a comparator for comparing two quantities and/or items of data in processes discussed herein, a determinator for making logical determinations based on compliance or non-compliance with various conditions in processes discussed herein. Modules 222 may use algorithm-based calculations, look up tables, software code, and/or similar tools stored in memory 212 for processing, analyzing, and operating on data to perform their respective functions. Modules 222 moreover may obtain and/or operate on data from exterior components, units, systems, etc., or from memory 212 of computing device 204.

Tool prediction system 220 of wafer dispatch program 206 may analyze, interpret, or otherwise be communicatively connected to dispatcher 110, plurality of tool(s) 122, and/or controller 130 to perform various processes according to the disclosure. For instance, tool prediction system 220 may organize plurality of tools 122 into at least two groups to prepare for subsequent processing according to the disclosure. By cross-referencing various forms of information included in historical data 140, tool prediction system 220 may identify at least one candidate tool 120a which is not represented in historical data 140. That is, candidate tools 120a may not be associated with any information in historical data 140 pertaining to an earlier performance of a particular operation, fabrication of the same product, etc., and thus would not otherwise be considered a possible site for dispatching semiconductor wafer(s) 102 (FIG. 1). Tool prediction system 220 may additionally identify at least one non-candidate tool 120b represented in historical data 140, e.g., by previously being used to perform the same operation, fabricate the same product, etc., such that non-candidate tool(s) 120b would conventionally be included in a list of possible sites for performing an operation on semiconductor wafer 102.

After identifying candidate tools 120a and non-candidate tools 120b in plurality of tools 122, tool prediction system 220 may determine whether historical data 140 for at least one candidate tool 120a is sufficient to predict the performance of an operation with candidate tool 120a, and/or to identify manufacturing settings for performing the operation with candidate tool(s) 120a. According to the disclosure, modules 222 of tool prediction system 220 may compare various forms of information in historical data 140 with the properties of candidate tool(s) 120a, and the operation to be performed, to determine whether historical data 140 will predict whether candidate tool(s) 120a may perform a proposed operation. Historical data 140 may therefore include, among other details, tool data 232 such as identifying information (e.g., serial number, part number, customer number, etc.) for non-candidate tool(s) 120b used in past operations. Historical data 140 may also include operation data 234 pertaining to past operations carried out by non-candidate tool(s) 120b. In a further example, historical data 140 may include product data 236 pertaining to products previously manufactured with non-candidate tools 120b. In addition, historical data 140 may include layer data 238 indicating which layers of a product were previously fabricated with corresponding non-candidate tool(s) 120b and/or operations. It is understood that in some organizations of data, product data 236 and/or layer data 238 may be included as part of operation data 234, or that any of the data categories of historical data 140 may include sub-categories. As discussed elsewhere herein, the available historical data 140 may be combined from multiple sources to determine whether one or more candidate tool(s) 120a may perform a particular operation, despite candidate tool(s) 120a not being represented in historical data 140.

Tool prediction system 220 of wafer dispatch program 206 may also be communicatively connected to controller 130 to adjust manufacturing settings for a particular operation. After determining whether historical data 140 will predict the performing of an operation with candidate tool(s) 120a, modules 222 of tool prediction system 220 may thereafter select one or more manufacturing settings for the operation by signaling controller 130. To this extent, tool prediction system 220 may apply reference setting(s) 242 associated with past operations in historical data 140, along with a corresponding manufacturing specification (mfg. specification) 244 to select various settings for the operation to be performed. The methodology for using historical data 140, reference settings 242, and/or mfg. specification 244 to adjust controller 130 may include selecting one or more manufacturing settings for candidate tool(s) 120a, e.g., using the features of a non-threaded controller 130. The selected settings may then be transmitted as signals to controller 130, which may then adjust candidate tool(s) 120a to perform the operation on one or more semiconductor wafers 102. In conjunction with adjusting controller 130, tool prediction system 220 may instruct dispatcher 110 to submit semiconductor wafer(s) 102 to candidate tool(s) 120a when historical data 140 is sufficient to predict the performing of an operation with candidate tool(s) 120a.

Where computer system 202 comprises multiple computing devices, each computing device may have only a portion of wafer dispatch program 206, modules 222, and/or historical data 140 thereon. However, it is understood that computer system 202 and tool prediction system 220 are only representative of various possible equivalent computer systems that may perform a process described herein. Computer system 202 may obtain or provide data, such as data stored in memory 212 or storage system 214, using any solution. For example, computer system 202 may generate and/or be used to generate data from one or more data stores, receive data from another system, send data to another system, etc.

Operational Methodology

Figure 6:
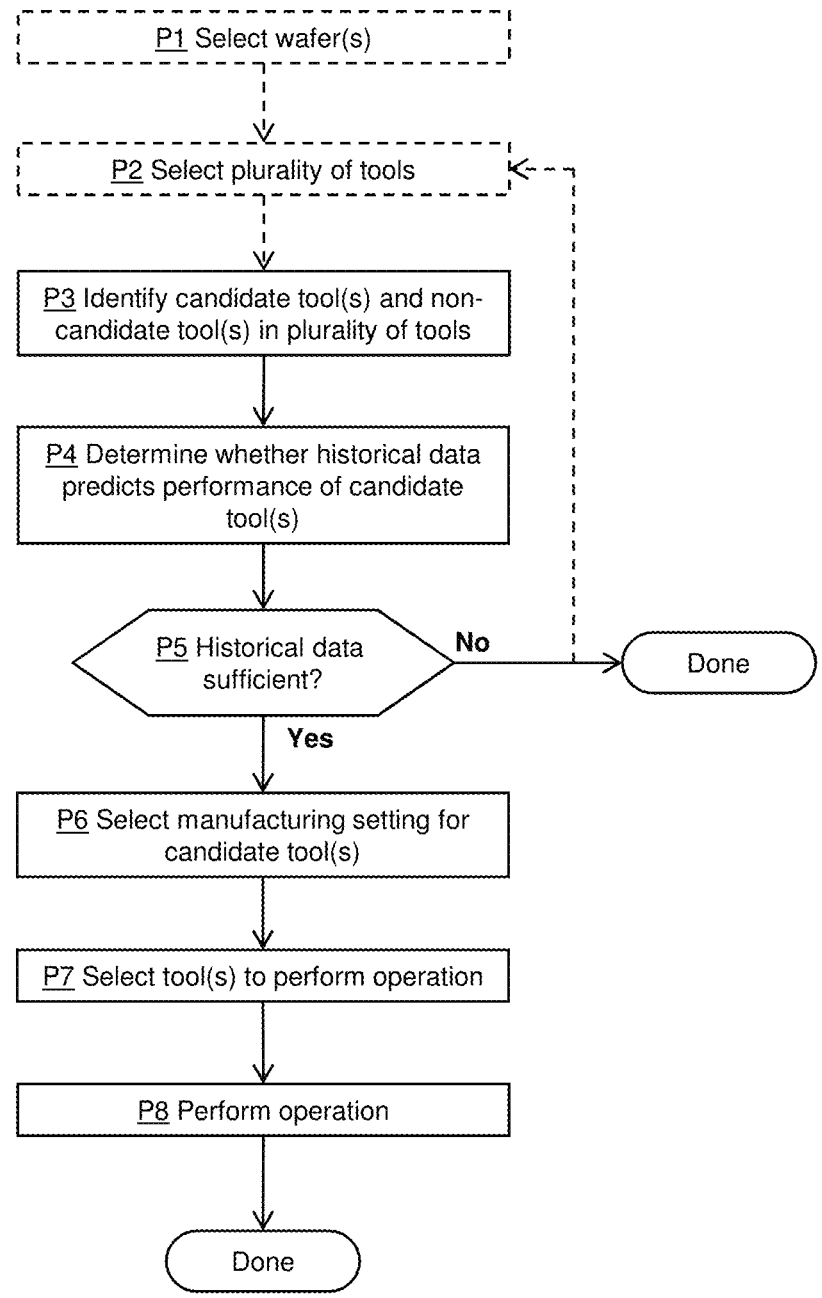
FIG. 6 is an example flow diagram of a method for selecting the manufacturing setting of a candidate tool based on historical data according to embodiments of the disclosure.

Referring to FIGS. 1, 5, and 6 together, the disclosure includes an example operational methodology of selecting processing settings for candidate tools 120a based on historical data 140 for other tools. Examples of an operational methodology discussed herein may include references to only one candidate tool 120a for the sake of simplicity, but it will be understood from further explanation and examples that multiple candidate tools 120a may be analyzed together in a single implementation of the processes described herein. In a preliminary action at process P1 (shown in phantom), modules 222 and/or a user of tool prediction system 220 may select one or more semiconductor wafers 102 to undergo an operation. The operation to be performed may include any currently known or later developed semiconductor manufacturing process, e.g., etching, deposition, heating, etc. Selecting semiconductor wafers 102 in process P1 may include selecting a single semiconductor wafer or a group of semiconductor wafers to undergo a specified operation or set of operations, depending on the process to be performed and/or the product to be manufactured.

Following the selecting of wafers in process P1, modules 222 and/or a user of tool prediction system 200 may specify, in process P2 (shown in phantom), a plurality of tools 122 which may be used to perform the specified operation on the selected wafers 102. Plurality of tools 122 may include one or more candidate tools 120a, i.e., tools not represented in historical data 140, and one or more non-candidate tools 120b, i.e., tools represented in historical data 140 (e.g., through one or more categories of data 232, 234, 236, 238). Selecting one plurality of tools 122 in process P2 may be implemented without regard to historical data 140 and/or availability, and may be based solely on selecting all tools associated with a type of operation (e.g., all deposition tools, all etching tools, all heating tools, etc.). Subsequent processes may then analyze plurality of tools 122 using historical data 140 to determine which candidate tools 120a may perform the specified operation.

Continuing to process P3, embodiments of the disclosure may identify, from plurality of tools 122, one or more candidate tools 120a and non-candidate tools 120b. As discussed above, each candidate tool 120a may lack representation in historical data 140, while non-candidate tools 120b may be represented in historical data 140, e.g., through tool data 232, operation data 234, product data 236, and/or layer data 238. Apart from the representation or lack of representation in historical data 140, candidate tools 120a may otherwise be indistinguishable from non-candidate tools 120b. To implement process P3, modules 222 may correlate historical data 140 with individual non-candidate tools 120b. Modules 222 may thereafter designate other tools as candidate tools 120a based on an absence of information in historical data 140 to correlate with the designated candidate tools 120a. Process P3 may additionally or alternatively include, e.g., designating candidate tools 120a in plurality of tools as a result of user and/or system pre-identification. Such pre-identification of candidate tools 120a may include, e.g., manually flagging candidate tools 120a which have not been used in any previous operations, i.e., lacking representation in historical data 140. Regardless of implementation, all tools 120 in plurality of tools 122 will be identified as candidate tools 120a or non-candidate tools 120b following the completion of process P3.

Subsequent to identifying all tools 120 in plurality of tools 122 as either candidate tools 120a or non-candidate tools 120b, the methodology may proceed to a determination of whether historical data 140 is sufficient to predict the performance of candidate tool(s) 120a. Thus, in process P4 of the disclosure, modules 222 may examine the data for non-candidate tools 120b within historical data 140 (e.g., tool data 232, operation data 234, product data 236, layer data 238, etc.) to determine whether such data predicts the same or similar operations being considered for candidate tool(s) 120a. The determining in process P4 may include, e.g., creating a matrix of unknown manufacturing settings for each candidate tool 120a, and attempting to populate the vacant cells of the matrix with historical data 140 from one or more non-candidate tools 120b. For instance, the determining in process P4 can include determining which non-candidate tools 120b have fabricated the same layer of the same product in a past operation. In other cases, modules 222 of tool prediction system 220 may evaluate a matrix of possible manufacturing settings, based on the imported historical data from non-candidate tool(s) 120b, to determine whether historical data 140 predicts the performing of a predetermined operation with candidate tool(s) 120a. According to further examples, the determining in process P4 may include generating one or more simulations of the operation using one or more corresponding sets of data, settings, etc., obtained via historical data 140 for non-candidate tools 120b. In a more specific example, it is possible to apply linear algebraic techniques to mathematically determine whether historical data 140 is sufficient to predict the performance of the operation with candidate tool(s) 120b and thereby select manufacturing settings with candidate tool(s) 120b. Such techniques are described in detail elsewhere herein by reference to FIGS. 7-8.

Regardless of the methodology for determining whether historical data 140 predicts performing a predetermined operation with candidate tool(s) 120a, the methodology may proceed to process P5 for determining whether to use candidate tool(s) 120a to perform the predetermined operation on wafer(s) 102. Process P5 may include, e.g., applying a determinator of modules 222 to determine whether historical data 140 predicts the performance of candidate tool(s) 120a. As discussed elsewhere herein, the determination can be based on whether a matrix of settings for candidate tool 120a is completed via historical data 140, whether modules 222 for simulating the operation of candidate tool(s) 120a have sufficient inputs to simulate the operation, etc. In the case that historical data 140 does not predict the performing of the operation with candidate tool(s) 120a (i.e., "No" at process P5), the methodology may conclude ("Done"). In this case, non-candidate tool(s) 120b may perform the operation on wafer(s) 102 when available for use. In an alternative case, the methodology may return to process P2 of selecting another plurality of tools 122, including one or more unanalyzed candidate tool(s) 120a for analysis, and repeating the identification, determination, etc., of processes P3, P4, P5. In the case that historical data 140 predicts how candidate tool(s) 120a will perform the operation (i.e., "Yes" at process P5), the methodology may continue to additional processes for configuring candidate tool(s) 120a to performs the operation.

In process P6, the method may include selecting manufacturing settings for one or more candidate tool(s) 120a capable of being configured for the operation via historical data 140. Process P6 may include, e.g., cross-referencing and/or directly applying operational data 234 from historical data 140 to candidate tool(s) 140a, configuring a set of manufacturing settings via reference settings 242 imported from historical data 140. Reference settings 242 may be used alone to select settings for the operation, or may be used in combination with a manufacturing specification 244 for the operation to be performed and/or the product to be created, a simulation of the operation with historical data 140, etc. However implemented, modules 222 of tool prediction system 220 may generate the settings in the form of instructions, code, etc., to be relayed to controller 130. Controller 130 may then compile the various settings generated in process P6 along with other settings for other candidate tool(s) 120a, and where applicable, known settings for non-candidate tools 120b. Controller 130 may subsequently use the selected manufacturing settings when candidate tool(s) 120a perform an operation on wafer(s) 102.

After selecting manufacturing settings for candidate tool(s) 120a in process P6, the methodology may include process P7 of selecting one or more tools 120a, 120b to perform the operation on wafer(s) 102. At process P7, a user of system 100 and/or a dispatching system (e.g., dispatcher 110) may independently generate a listing of which candidate tool(s) 120a and non-candidate tools 120b are capable of performing the operation. In some cases, the listing may optionally be generated internally by modules 222 of tool prediction system 222 or other components of wafer dispatch program 206. An example of such a listing is shown in FIG. 4 and discussed in further detail elsewhere herein. A user and/or component of system 100 (e.g., dispatcher 110 and/or computer system 200) may manually or automatically select one or more available (i.e., non-busy) tools 120a, 120b to perform the predetermined operation on wafer(s) 102.

After selecting a tool to perform the operation, the methodology may continue to process P8 of performing the operation using candidate and/or non-candidate tools 120a, 120b. Where candidate tool(s) 120a are selected to perform the operation on wafer(s) 102, performing the operation in process P8 may include using the manufacturing settings selected in process P6. In cases where a non-candidate tool 120b is selected to perform the operation (i.e., due to unavailability of candidate tool(s) 120a), the settings selected in process P6 may be stored in memory 212 and/or added to historical data 140 for use in future operations. It is thus understood that technical effects of the operational methodology discussed herein may include, e.g., reduction in wait times during manufacture, expanded use of newer manufacturing tools (i.e., candidate tools 120a), improved manufacturing quality of products created via plurality of tools 122, and the generation of a knowledge base for future implementation of known processes with new pluralities of tools 122. It is also understood that the present disclosure may be implemented on a single candidate tool 120a, or on multiple candidate tools 120a simultaneously. An illustrative example with multiple candidate tools 120a is provided herein, and discussed via reference to FIGS. 7-8.

Example Methodologies for Determining Sufficiency of Historical Data

Figure 7:
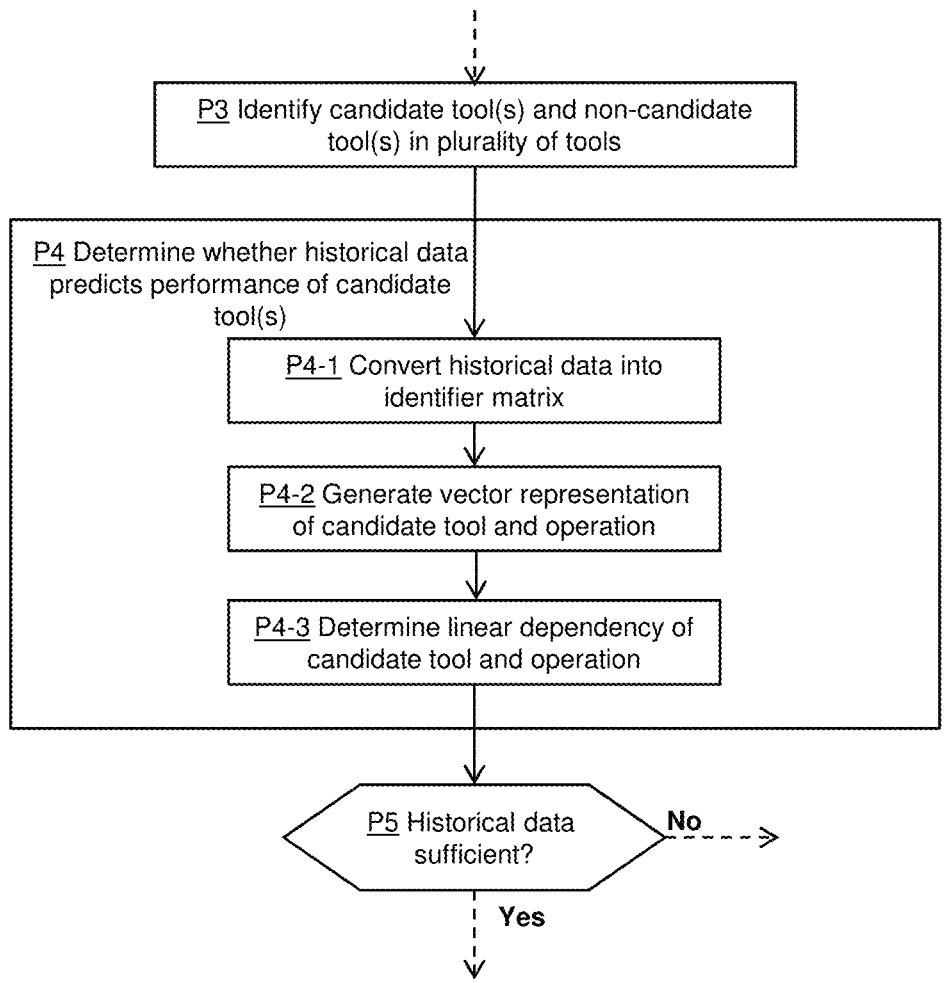
FIG. 7 is an example flow diagram of a method for determining whether available historical data predicts the performance of a candidate tool according to embodiments of the disclosure.

Referring to FIGS. 1, 5, and 7 together, the disclosure further includes sub-processes for determining whether historical data 140 predicts performing a predetermined operation with candidate tool(s) 120a. As discussed elsewhere herein, some embodiments of controller 130, sometimes known as "non-threaded controllers," may be configured to apply historical data 140 from different operations, products, tools, layers, etc., to generating manufacturing settings for a different operation or tool. The features of such controllers 130 may allow an operation to be performed using candidate tools 120a despite their non-representation in historical data 140 (i.e., the operation note being previously implemented with candidate tools 120a). To identify whether controller 130 and/or computer system 200 may select manufacturing settings for candidate tool(s) 120a using historical data 140, process P4-1 may include converting historical data 140 into an identifier matrix indicative of, e.g., tools represented in historical data 140, products created such non-candidate tools 120b, product layers manufactured in a past operation, etc. The converting of historical data 140 into an identifier matrix may occur subsequent to identifying candidate tools 120a and non-candidate tools 120b in process P3. Table 1, below, provides an example listing of historical data 140 for two non-candidate tools 120b ("TOOL1" and "TOOL2," both etching tools in this example) for creating two products (identified by example as "PRODUCT1" and "PRODUCT2"). In the present example, the predetermined operation to be implemented is a fabrication of the PRODUCT2 product at layer LAYER1. The product to be manufactured and the layer of implementation together may define the operation to be performed with a tool 120 in system 100. Tool TOOL1 thus is considered to be a non-candidate tool due to the past fabrication of the same product at the same layer. Tool TOOL2, by contrast is not represented in historical data 140 as fabricating the same layer of the same product (i.e., has not previously performed the operation) and thus is considered to be a candidate tool.

| Example 1: Historical data for two etching tools | | |
| --- | --- | --- |
| Tool | Product | Layer |
| TOOL1 | PRODUCT1 | LAYER1 |
| TOOL2 | PRODUCT1 | LAYER1 |
| TOOL1 | PRODUCT2 | LAYER1 |

In a conventional setting, tool TOOL1 would be the only tool 120 considered by dispatcher 110, due to its representation in historical data 140. As discussed herein, however, historical data 140 includes sufficient information regarding both tools to select manufacturing settings for performing the operation with tool TOOL2. Process P4-1 thus may include converting a table representation of historical data 140 into an identifier matrix for depicting the same information. According to the example, an identifier matrix A may be presented as:

$$A = \begin{bmatrix} 1 & 0 & 1 & 0 & 1 \\ 0 & 1 & 1 & 0 & 1 \\ 1 & 0 & 0 & 1 & 1 \end{bmatrix}$$

In which the first two columns of A correspond to the tools (TOOL1 and TOOL2, respectively), the third and fourth columns correspond to the product (PRODUCT1 and PRODUCT2, respectively) and the final column corresponds to the layer (LAYER1). In the case where historical data 140 includes multiple layers, additional columns may be added to represent the other layers. Thus, the number of columns included in a particular identifier matrix may be dependent on the types of information available in each setting, e.g., the types of identifying features available for each tool and operation.

Continuing to process P4-2, the operation under analysis for each candidate tool 120a may similarly be converted to a vector representation. The vector representation, according to an example, may be structured to be indicative of a specific candidate tool 120a under analysis, as well as the operation to be performed. Continuing with the example provided herein, tool prediction system 220 is investigating whether historical data 140 is sufficient to predict the manufacture of PRODUCT2 in layer LAYER1 with tool TOOL2. Following the organizational features of matrix A, modules 222 of tool prediction system 220 may generate a vector representation of this tool and operation as an indicator vector $a^T$:

$$a^T = [0\ 1\ 0\ 1\ 1].$$

Here, the first two columns of the indicator matrix correspond to the tools, the third and fourth columns correspond to the product, and the final column corresponds to the layer.

One or more linear algebraic techniques may be applied to the identifier matrix for historical data 140 and the vector representation of candidate tool(s) 120a to determine the sufficiency of historical data 140. That is, analysis of the data included in each matrix representation mathematically indicates whether historical data 140 predicts the performing of the operation with each candidate tool 120a. In an example, the methodology may include process P-3 of determining linear dependency of candidate tool 120a and the operation in the corresponding identifier matrix from process P4-1. According to an example, the presence of information for a particular operation in matrix A of historical data 140, e.g., similar or identical to operational data in indicator vector $a^T$, may indicate that historical data 140 predicts the performance of candidate tool 120a (i.e., TOOL2 in this example). One methodology for analyzing the sufficiency of historical data 140 may include determining whether indicator vector $a^T$ is linearly dependent in identifier matrix A, i.e., determining whether a change in historical data 140 will yield a corresponding linear change to the characteristics of indicator vector $a^T$.

Figure 8:
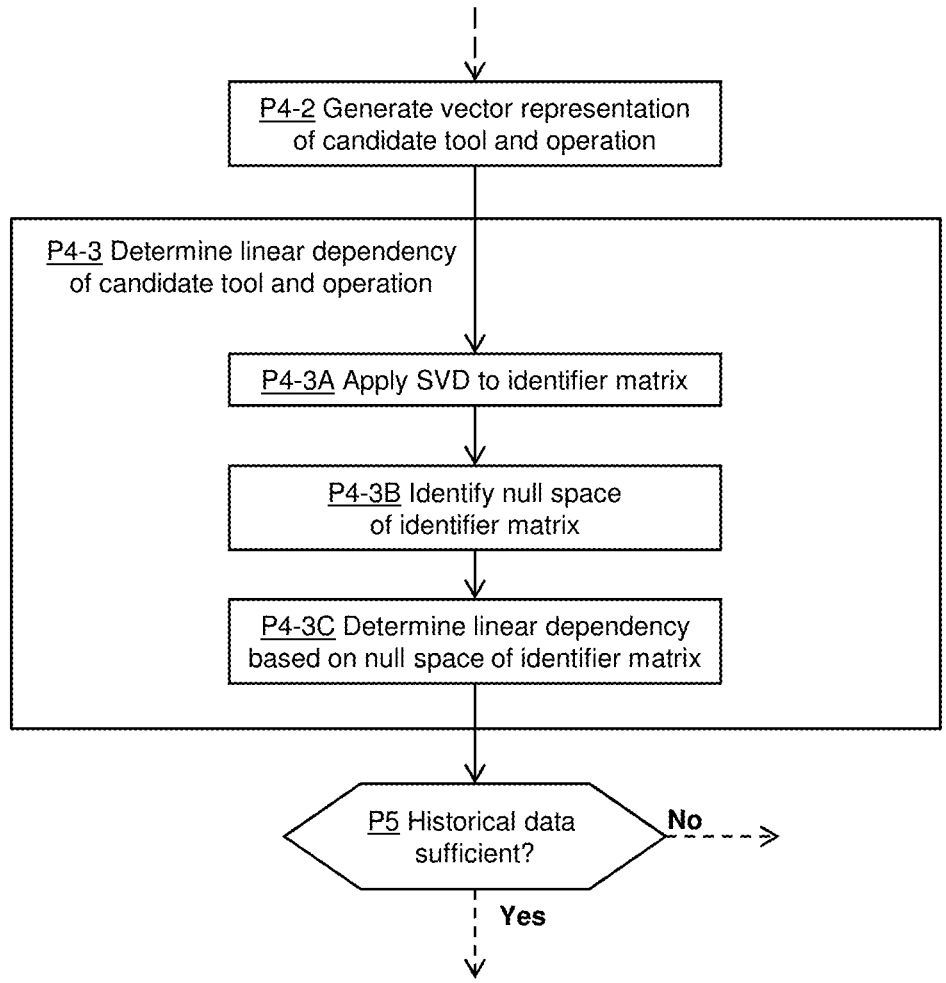
FIG. 8 is an example flow diagram of a method for determining linear dependency of a candidate tool and operation in an identifier matrix according to embodiments of the disclosure.

Referring to FIGS. 1, 5, and 8 together, process P4-3 may be subdivided into specific mathematical operations to determine the linear dependency of the candidate tool and operation in the identifier matrix. The sub-processes P4-3A, P4-3B, and P4-3C discussed herein may yield a specific mathematical indication of whether historical data 140 predicts the performing of an operation with candidate tool(s) 120a. Sub-processes P4-3A, P4-3B, and P4-3C are discussed by continued reference to the example of tools TOOL1, TOOL2 for products PRODUCT1 and PRODUCT2 in layer LAYER1.

A first sub-process of process P4-3 may include applying singular value decomposition (SVD) to identifier matrix A to yield a set of orthonormal bases, i.e., a set of unit vectors orthogonal to a matrix under analysis. More specifically, after creating identifier matrix A and indicator vector $a^T$, modules 222 of tool prediction system 220 may apply SVD to identifier matrix A to yield a set of orthonormal basis for indicator vector $a^T$, i.e., values indicative of linear dependency in matrix A for a group of products, tools, and operations. The SVD operation may be implemented via the formula:

$$A = USV^T,$$

in which S is a diagonal matrix of singular values and U and V are the left and right singular vectors, respectively. The rank, r, of A, is the number of non-zero singular values. Returning now to the example, the singular value decomposition for matrix A is shown via the following matrices:

$$\begin{bmatrix} -0.643 & 0 & 0.766 \\ -0.542 & -0.707 & -0.454 \\ -0.542 & 0.707 & -0.454 \end{bmatrix} \begin{bmatrix} 2.524 & 0 & 0 & 0 & 0 \\ 0 & 1.414 & 0 & 0 & 0 \\ 0 & 0 & 0.792 & 0 & 0 \end{bmatrix}$$

$$\begin{bmatrix} -0.469 & -0.215 & -0.469 & -0.215 & -0.684 \\ 0.5 & -0.5 & -0.5 & 0.5 & 0 \\ 0.394 & -0.5 & 0.394 & -0.574 & -0.180 \\ -0.304 & -0.304 & 0.602 & 0.602 & -0.298 \\ -0.532 & -0.532 & -0.110 & -0.110 & 0.641 \end{bmatrix}$$

in which the three matrices correspond, in order, to vectors U, S, and $V_T$, respectively. In this example, the singular value matrix (S) includes only zeroes in the final two columns.

After applying SVD to identifier matrix A in process P4-3A, continued operation may include identifying the null space of identifier matrix A to mathematically indicate the linear dependency of each indicator vector. In the SVD equation, vector V is orthonormal ($VV^T = I$). Thus, the last two rows of matrix $V^T$ span the null space of matrix A. The null space of Matrix A thus may be represented in matrix form as:

$$\text{Null}(V) = \begin{bmatrix} -0.304 & -0.532 \\ -0.304 & -0.532 \\ 0.602 & -0.110 \\ 0.602 & -0.110 \\ -0.298 & 0.641 \end{bmatrix} \stackrel{def}{=} V_n.$$

Continuing with the present example, the formula $V_n V_n^T$ defines a null basis for identifier matrix A.

Turning now to sub-process P4-3C, the null space of identifier matrix A may be used in conjunction with each indicator vector to mathematically illustrate whether an indicator vector is linearly dependent in identifier matrix A. Any vector representation for a particular operation and candidate tool 120a under analysis being within the null space for matrix A will indicate linear dependency in matrix A for historical data 140. Conversely, the vector representation for a given tool and operation being outside the null space of matrix A will indicate non-linear dependency, and thereby indicates a lack of sufficient historical data 140 in matrix A. Mathematically, the determining in process P4-3C may be shown by the following table:

| Case | Implication |
| --- | --- |
| $V_n V_n^T a = 0$ | Valid run path |
| $V_n V_n^T a \neq 0$ | Invalid run path |

Returning to the example of attempting to produce PRODUCT2 in layer LAYER1 with tool TOOL2, the corresponding indicator vector $a^T$ will be [0 1 0 1 1] as noted above. Applying the null space of matrix A causes the operation $V_n V_n^T a$ to yield matrix

[0 0 0 0 0]. The resulting matrix lacks non-zero values, and thereby indicates that historical data 140 is sufficient to predict how tool TOOL2 will product PRODUCT2 in layer LAYER1. Referring briefly to FIG. 6, the flow may then proceed to process P5 of indicating that historical data 140 is sufficient to predict the performance of candidate tool 120*a* in the form of etching tool TOOL2. Subsequent implementation of process P6 may then apply the settings for non-candidate tool 120*b* in the form of etching tool TOOL1, e.g., a previously selected etch time in milliseconds, to the proposed operation of etching tool TOOL2.

For the sake of comparison, an alternative example is provided in which historical data 140 is not sufficient to predict the performance of an operation with candidate tool 120*a*. In the following example, historical data 140 is less extensive and includes only two past operations:

TABLE 2

Example historical data for two etching tools

| Tool | Product | Layer |
|---|---|---|
| TOOL2 | PRODUCT1 | LAYER1 |
| TOOL1 | PRODUCT2 | LAYER1 |

Following the conventions of example 1, the identifier matrix A may take the following form:

$$A = \begin{bmatrix} 0 & 1 & 1 & 0 & 1 \\ 1 & 0 & 0 & 1 & 1 \end{bmatrix}.$$

Continuing to process P4-3A, modules 222 of tool prediction system 220 will apply SVD to identifier matrix A. In this case, vector S will have two non-zero values due to identifier matrix A having a rank of "2." By applying the SVD formula "$A=USV^T$" from the above explanation, the final three columns of vector V (i.e., rank value of 2 for vector S subtracted from the number of columns (5) in vector A) will determine the null space of matrix A. To determine whether historical data 140 predicts the manufacture of product PRODUCT2 in layer LAYER1, indicator vector $a^T$ will be denoted as [0 1 0 1 1]. Applying operation $V_n V_n^T a$ as a test for linear dependency, the resulting matrix [−0.5 0.5 −0.5 0.5 0] includes non-zero values, thereby indicating a lack of linear dependency. Thus, historical data 140 will not predict the performance of candidate tool 120*a* (i.e., tool TOOL2) in this second example. Referring briefly to FIG. 6, continued processing would indicate historical data 140 as not predicting the performance of candidate tool 120*a* (i.e., tool TOOL2), may cause the methodology to end ("Done") or return to process P2 of selecting another candidate tool 120*a* for analysis. In implementations where candidate tool 120*a* (i.e., tool TOOL2) is only one of several candidate tools 120*a* analyzed together (discussed below), the methodology may continue to processes P6-P8 so long as historical data 140 is sufficient for at least one candidate tool 120*a*.

With continued reference to FIGS. 1, 5, and 8 together, advantages of the present disclosure include the ability to mathematically analyze the sufficiency of historical data 140 for predicting the performance of multiple candidate tools 120*a*. An advantage of the linear algebra-based analysis described herein is the ability to mathematically model a group of candidate tools 120*a* together by expanding the size of indicator vector $a^T$. That is, multiple indicator vector $a^T$ may be combined into a single indicator matrix $A_{new}$ for simultaneous investigation of several candidate tools 120*a* in a single implementation of processes P4-1, P4-2, P4-3. For example, process P4-2 may include generating vector representations of each candidate tool and operation, each taking the form of one indicator vector $a^T$. The indicator vectors for an arbitrary number of candidate tools "n" may then be combined into a single matrix via the formula:

$$A_{new} = \begin{bmatrix} a_1^T \\ \vdots \\ a_n^T \end{bmatrix}.$$

Subsequently, a single application of SVD to identifier matrix A may be used to simultaneously examine whether each indicator vector of $A_{new}$ exists in the null space of identifier matrix A. The mathematical representation of process P4-3C thus takes the modified form:

$$A_{new} V V_n^T.$$

The resulting single-column vector may include a one or zero in each row. Rows having a value of zero indicate linear dependency for the corresponding candidate tool 120*a*, as in the first single tool example above, while rows having a non-zero value indicate a lack of linear dependency, as in the second single tool example above. It is therefore understood that embodiments of the methodology herein may swiftly investigate whether historical data 140 sufficiently predicts whether hundreds, thousands, millions, etc., of candidate tools 120*a* will perform a predetermined operation on wafer(s) 102.

Alternative Embodiments and Implementations

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be used. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the layout, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As used herein, the term "configured," "configured to" and/or "configured for" may refer to specific-purpose patterns of the component so described. For example, a system or device configured to perform a function may include a computer system or computing device programmed or otherwise modified to perform that specific function. In other cases, program code stored on a computer-readable medium (e.g., storage medium), may be configured to cause at least one computing device to perform functions when that program code is executed on that computing device. In these cases, the arrangement of the program code triggers specific functions in the computing device upon execution. In other examples, a device configured to interact with and/or act upon other components may be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component may aid in performing a function, for example, displacement of one or more of the device or other component, engagement of one or more of the device or other component, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    identifying, from a plurality of tools for performing an operation on a semiconductor wafer:
        at least one non-candidate tool which previously performed the operation on at least one prior semiconductor wafer, wherein the at least one non-candidate tool is represented in a set of historical data, wherein the set of historical data includes a past manufacturing setting for the at least one non-candidate tool performing the operation on the at least one prior semiconductor wafer, and wherein the past manufacturing setting includes one of an etch time, an etch rate, a deposition time, or a deposition rate for performing the operation with the at least one non-candidate tool, and
        a candidate tool which has not previously performed the operation on the at least one prior semiconductor wafer, and is not associated with any past manufacturing settings in the historical data, wherein the candidate tool is not represented in the set of historical data;
    determining whether the past manufacturing setting of the at least one non-candidate tool in the set of historical data correlates to performing the operation with the candidate tool based on the past manufacturing setting for performing the operation on the at least one prior semiconductor wafer with the at least one non-candidate tool;

in response to the past manufacturing setting in the set of historical data correlating to the performing of the operation with the candidate tool, selecting the past manufacturing setting for the candidate tool as a selected manufacturing setting for the candidate tool based on the set of historical data; and performing the operation on the semiconductor wafer with the candidate tool and with the selected manufacturing setting for the candidate tool to produce a manufactured component from the semiconductor wafer, after selecting the past manufacturing setting for the candidate tool.

2. The method of claim 1, wherein the candidate tool comprises one of a plurality of candidate tools in the plurality of tools for performing the operation on the semiconductor wafer, wherein the determining includes simultaneously determining whether the set of historical data predicts the performing of the operation with each of the plurality of candidate tools, and wherein each of the plurality of candidate tools is not represented in the set of historical data.

3. The method of claim 1, wherein the determining of whether the past manufacturing setting of the at least one non-candidate tool in the set of historical data correlates to the performing of the operation with the candidate tool includes:

converting the set of historical data into an identifier matrix, the identifier matrix indicative of, for the at least one non-candidate tool: a tool identification, and an identification of the at least one prior operation;

generating a vector representation of the candidate tool and the operation; and determining whether the vector representation of the candidate tool and the operation is linearly dependent in the identifier matrix, wherein the vector representation of the candidate tool and the operation being linearly dependent in the identifier matrix indicates that the set of historical data predicts the performing of the operation with the candidate tool, and wherein the vector representation of the candidate tool and the operation not being linearly dependent in the identifier matrix indicates that the set of historical data does not predict the performing of the operation with the candidate tool.

4. The method of claim 3, wherein the identifier matrix is further indicative of a product layer where the at least one prior operation is performed.

5. The method of claim 3, wherein the determining of whether the vector representation of the candidate tool and the operation is linearly dependent in the identifier matrix includes:

applying a singular value decomposition (SVD) to the identifier matrix to yield a set of orthonormal bases for the identifier matrix;

identifying a null space of the identifier matrix based on the set of orthonormal bases; and determining whether the vector representation of the candidate tool and the operation is linearly dependent in the identifier matrix based on whether the vector representation of the candidate tool and the operation is within the null space of the identifier matrix.

6. A computer program product stored on a non-transitory computer readable storage medium, the computer program product comprising program code, which, when being executed by at least one computing device, causes the at least one computing device to:

identify, from a plurality of tools for performing an operation on a semiconductor wafer:

at least one non-candidate tool which previously performed the operation on at least one prior semiconductor wafer, wherein the at least one non-candidate tool is represented in a set of historical data, wherein the set of historical data includes a past manufacturing setting for the at least one non-candidate tool performing the operation on the at least one prior semiconductor wafer, and wherein the past manufacturing setting includes one of an etch time, an etch rate, a deposition time, or a deposition rate for performing the operation with the at least one non-candidate tool, a candidate tool which has not previously performed the operation on the at least one prior semiconductor wafer, and is not associated with any past manufacturing settings in the historical data, wherein the candidate tool is not represented in the set of historical data;

determine whether the past manufacturing setting of the at least one non-candidate tool in the set of historical data correlates to performing of the operation with the candidate tool based on the past manufacturing settings for performing the operation on the at least one prior semiconductor wafer with the at least one non-candidate tool;

in response to the past manufacturing setting in the set of historical data correlating to the performing of the operation with the candidate tool, select the past manufacturing setting as a selected manufacturing setting for the candidate tool based on the set of historical data; and causing the candidate tool to perform the operation on the semiconductor wafer with the selected manufacturing setting for the candidate tool to produce a manufactured component from the semiconductor wafer, after selecting the past manufacturing setting for the candidate tool.

7. The computer program product of claim 6, wherein the candidate tool comprises one of a plurality of candidate tools in the plurality of tools for performing the operation on the semiconductor wafer, wherein determining whether the set of historical data predicts the performing of the operation with the candidate tool includes simultaneously determining whether the set of historical data predicts the performing of the operation with each of the plurality of candidate tools, and wherein each of the plurality of candidate tools is not represented in the set of historical data.

8. The computer program product of claim 6, wherein the determining of whether the past manufacturing setting of the at least one non-candidate tool in the set of historical data correlates to the performing of the operation with the candidate tool includes:

converting the set of historical data into an identifier matrix, the identifier matrix indicative of, for the at least one non-candidate tool: a tool identification, and an identification of the at least one prior operation;

generating a vector representation of the candidate tool and the operation; and determining whether the vector representation of the candidate tool and the operation is linearly dependent in the identifier matrix, wherein the vector representation of the candidate tool and the operation being linearly dependent in the identifier matrix indicates that the set of historical data predicts the performing of the operation with the candidate tool, and wherein the vector representation of the candidate tool and the operation not being linearly dependent in the identifier matrix indicates that the set of historical data does not predict the performing of the operation with the candidate tool.

9. The computer program product of claim 8, wherein the identifier matrix is further indicative of a product layer where the at least one prior operation is performed.

10. The computer program product of claim 8, wherein determining whether the vector representation of the candidate tool and the operation is linearly dependent in the identifier matrix includes:
   applying a singular value decomposition (SVD) to the identifier matrix to yield a set of orthonormal bases for the identifier matrix;
   identifying a null space of the identifier matrix based on the set of orthonormal bases; and
   determining whether the vector representation of the candidate tool and the operation is linearly dependent in the identifier matrix based on whether the vector representation of the candidate tool and the operation is within the null space of the identifier matrix.

11. A system comprising at least one computing device configured to perform a method by performing actions including:
   identify, from a plurality of tools for performing an operation on a semiconductor wafer:
      at least one non-candidate tool which previously performed the operation on at least one prior semiconductor wafer, wherein the at least one non-candidate tool is represented in a set of historical data, wherein the set of historical data a past manufacturing setting for performing the operation on the at least one prior semiconductor wafer, and wherein the past manufacturing setting includes one of an etch time, an etch rate, a deposition time, or a deposition rate for performing the operation with the at least one non-candidate tool, and
      a candidate tool which has not previously performed the operation on the at least one prior semiconductor wafer, and is not associated with any past manufacturing settings in the historical data, wherein the candidate tool is not represented in the set of historical data;
   determine whether the past manufacturing setting of the at least one non-candidate tool in the set of historical data correlates to performing of the operation with the candidate tool based on the past manufacturing setting for the at least one non-candidate tool performing the operation on the at least one prior semiconductor wafer with the at least one non-candidate tool;
   in response to the past manufacturing setting in the set of historical data correlating to the performing of the operation with the candidate tool, select the past manufacturing setting for the candidate tool as a selected manufacturing setting for the candidate tool based on the set of historical data; and
   cause the candidate tool to perform the operation on the semiconductor wafer with the selected manufacturing setting for the candidate tool to produce a manufactured component from the semiconductor wafer, after selecting the past manufacturing setting for the candidate tool.

12. The system of claim 11, wherein the candidate tool comprises one of a plurality of candidate tools in the plurality of tools for performing the operation on the semiconductor wafer, wherein determining whether the set of historical data predicts the performing of the operation with the candidate tool includes simultaneously determining whether the set of historical data predicts the performing of the operation with each of the plurality of candidate tools, and wherein each of the plurality of candidate tools is not represented in the set of historical data.

13. The system of claim 11, wherein determining whether the past manufacturing setting of the at least one non-candidate tool in the set of historical data correlates to the performing of the operation with the candidate tool includes:
   converting the set of historical data into an identifier matrix, the identifier matrix indicative of, for the at least one non-candidate tool: a tool identification, and an identification of the at least one prior operation;
   generating a vector representation of the candidate tool and the operation; and
   determining whether the vector representation of the candidate tool and the operation is linearly dependent in the identifier matrix, wherein the vector representation of the candidate tool and the operation being linearly dependent in the identifier matrix indicates that the set of historical data predicts the performing of the operation with the candidate tool, and wherein the vector representation of the candidate tool and the operation not being linearly dependent in the identifier matrix indicates that the set of historical data does not predict the performing of the operation with the candidate tool.

14. The system of claim 11, wherein determining whether the vector representation of the candidate tool and the operation is linearly dependent in the identifier matrix includes:
   applying a singular value decomposition (SVD) to the identifier matrix to yield a set of orthonormal bases for the identifier matrix;
   identifying a null space of the identifier matrix based on the set of orthonormal bases; and
   determining whether the vector representation of the candidate tool and the operation is linearly dependent in the identifier matrix based on whether the vector representation of the candidate tool and the operation is within the null space of the identifier matrix.

\* \* \* \* \*